United States Patent
Cherkasova et al.

(10) Patent No.: US 9,213,584 B2
(45) Date of Patent: Dec. 15, 2015

(54) VARYING A CHARACTERISTIC OF A JOB PROFILE RELATING TO MAP AND REDUCE TASKS ACCORDING TO A DATA SIZE

(75) Inventors: Ludmila Cherkasova, Sunnyvale, CA (US); Abhishek Verma, Champaign, IL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 128 days.

(21) Appl. No.: 14/110,398

(22) PCT Filed: May 11, 2011

(86) PCT No.: PCT/US2011/036013
§ 371 (c)(1),
(2), (4) Date: Oct. 7, 2013

(87) PCT Pub. No.: WO2012/154177
PCT Pub. Date: Nov. 15, 2012

(65) Prior Publication Data
US 2014/0026147 A1    Jan. 23, 2014

(51) Int. Cl.
*G06F 9/46*    (2006.01)
*G06F 9/50*    (2006.01)
*G06Q 10/06*    (2012.01)
*G06Q 10/10*    (2012.01)

(52) U.S. Cl.
CPC .............. *G06F 9/5083* (2013.01); *G06F 9/505* (2013.01); *G06F 9/5066* (2013.01); *G06Q 10/06315* (2013.01); *G06Q 10/10* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 2008/0086442 | A1 | 4/2008 | Dasdan |
| 2009/0313635 | A1 | 12/2009 | Dasdan |
| 2010/0005080 | A1 | 1/2010 | Pike et al. |
| 2010/0205075 | A1 | 8/2010 | Zhang |
| 2010/0281078 | A1 | 11/2010 | Wang et al. |

OTHER PUBLICATIONS

Aster Data, Datasheet, Aster Data Advanced In-Database Analytics, 2009, pp. 2.
Chen et al, "INTEL, Map-Reduce Meets Wider Varieties of Applications" IRP-TR-08-05, 2008, pp. 8.
Konwinski, Improving MapReduce Performance in Hetergeneous Environments, Tech Report UCB/EECS-2009-183, Dec. 2009, pp. 40.
PCT Search Report/Written Opinion—Application No. PCT/US2011/036013 dated Dec. 27, 2011—pp. 9.
Sun et al, Scalable RDF Store Based on HBase and Map Reduce, 3rd Int'l Conf on Adv. Computer Theory and Engineering, 2010, pp. 4.
Verma et al—ARIA: Automatic Resource Inference and Allocation of MapReduce Environments—Thesis—HP Labs May 2011—10 pags.

(Continued)

*Primary Examiner* — Gregory A Kessler
(74) *Attorney, Agent, or Firm* — Trop, Pruner & Hu, P.C.

(57) ABSTRACT

A job profile is received that includes characteristics of a job to be executed, where the characteristics of the job profile relate to map tasks and reduce tasks of the job. The map tasks produce intermediate results based on input data, and the reduce tasks produce an output based on the intermediate results. The characteristics of the job profile include at least one particular characteristic that varies according to a size of data to be processed. The at least one particular characteristic of the job profile is set based on the size of the data to be processed.

20 Claims, 4 Drawing Sheets

(56) References Cited

OTHER PUBLICATIONS

Yoo et al, Phoenix Rebirth: Scalable Map Reduce on a Large-Scale Shared-Memory System, 2009, IEEE, pp. 10.

Cherkasova, et al. U.S. Appl. No. 13/019,529, filed Feb. 2, 2011, pp. 48.

Hewlett Packard International Application, PCT/US2011/023438 filed Feb. 2, 2011, pp. 42.

Hewlett Packard International Applications, PCTIUS2011/032969 filed Apr. 19, 2011, pp. 36.

VARYING A CHARACTERISTIC OF A JOB PROFILE RELATING TO MAP AND REDUCE TASKS ACCORDING TO A DATA SIZE

CROSS-REFERENCE TO RELATED APPLICATION

This application is a national stage application under 35 U.S.C. §371 of PCT/US2011/036013, filed May 11, 2011.

BACKGROUND

Many enterprises (such as companies, educational organizations, and government agencies) employ relatively large volumes of data that are often subject to analysis. A substantial amount of the data of an enterprise can be unstructured data, which is data that is not in the format used in typical commercial databases. Existing infrastructures may not be able to efficiently handle the processing of relatively large volumes of unstructured data.

BRIEF DESCRIPTION OF THE DRAWINGS

Some embodiments are described with respect to the following figures.

DETAILED DESCRIPTION

Figure 1:
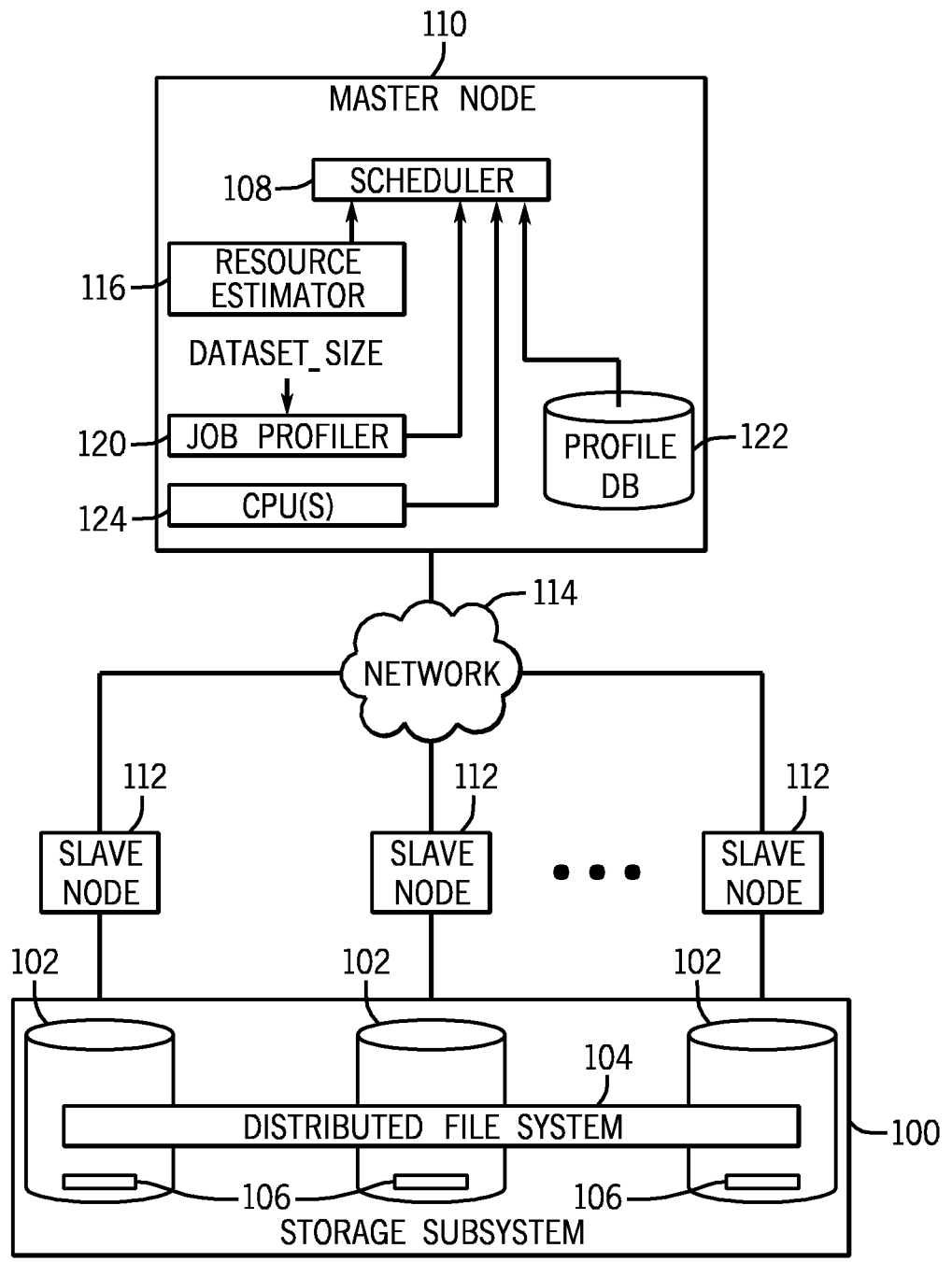
FIG. 1 is a block diagram of an example arrangement that incorporates some implementations.

For processing relatively large volumes of unstructured data, a MapReduce framework that provides a distributed computing platform can be employed. Unstructured data refers to data not formatted according to a format of a relational database management system. An open source implementation of the MapReduce framework is Hadoop. The MapReduce framework is increasingly being used across enterprises for distributed, advanced data analytics and for enabling new applications associated with data retention, regulatory compliance, e-discovery, and litigation issues. The infrastructure associated with the MapReduce framework can be shared by various diverse applications, for enhanced efficiency.

Generally, a MapReduce framework includes a master node and multiple slave nodes (also referred to as worker nodes). A MapReduce job submitted to the master node is divided into multiple map tasks and multiple reduce tasks, which are executed in parallel by the slave nodes. The map tasks are defined by a map function, while the reduce tasks are defined by a reduce function. Each of the map and reduce functions are user-defined functions that are programmable to perform target functionalities.

The map function processes segments of input data to produce intermediate results, where each of the multiple map tasks (that are based on the map function) process corresponding segments of the input data. For example, the map tasks process input key-value pairs to generate a set of intermediate key-value pairs. The reduce tasks (based on the reduce function) produce an output from the intermediate results. For example, the reduce tasks merge the intermediate values associated with the same intermediate key.

More specifically, the map function takes input key-value-pairs $(k_1, v_1)$ and produces a list of intermediate key-value pairs $(k_2, v_2)$. The intermediate values associated with the same key $k_2$ are grouped together and then passed to the reduce function. The reduce function takes an intermediate key $k_2$ with a list of values and processes them to form a new list of values $(v_3)$, as expressed below.

$$\mathrm{map}(k_1, v_1) \rightarrow \mathrm{list}(k_2, v_2).$$

$$\mathrm{reduce}(k_2, \mathrm{list}(v_2)) \rightarrow \mathrm{list}(v_3)$$

The multiple map tasks and multiple reduce tasks (of multiple jobs) are designed to be executed in parallel across resources of a distributed computing platform.

To properly manage execution of jobs including map tasks and reduce tasks, performance parameters of respective jobs can be estimated. Performance parameters refer to parameters that represent execution attributes of a job during execution of the job. For example, a performance parameter can relate to an execution time duration of the job.

Under certain scenarios, the ratio of map tasks to reduce tasks of corresponding jobs can remain relatively constant in response to input datasets of varying sizes. In other words, as an input dataset increases in size, the number of reduce tasks increases proportionally with the number of map tasks. Thus, performance parameters can be calculated for jobs without considering sizes of the input datasets.

However, in other implementations, the foregoing assumption may not be true. For example, certain applications assume that there is a fixed number of reduce tasks—thus, even if the input dataset were to grow, the number of reduce tasks would still remain fixed. For such applications, increasing the dataset while keeping the same number of reduce tasks leads to an increased amount of data shuffled and processed per reduce task. Consequently, in such scenarios, the job profile of a job changes with varying input dataset size—varying job profiles with different input dataset sizes also causes performance parameters that are estimated for corresponding jobs to change.

More generally, rather than specifying a fixed number of reduce tasks, other implementations can involve a change in a ratio of a number of reduce tasks to a number of map tasks in response to changing input dataset sizes. In other words, in response to a change in input dataset size, the number of reduce tasks does not change proportionally with the number of map tasks. For example, in response to input dataset size increasing by a factor of two, the number of map tasks can increase by a factor of two, but the number of reduce tasks can change by less than (or greater than) the factor of two. In such scenarios, changing input dataset sizes also causes variations in job profiles, and thus variations in estimated performance parameters.

In accordance with some implementations, techniques or mechanisms am provided to perform scaling, in which scaling parameters are used to modify characteristics of a job profile in response to varying dataset sizes. The scaling parameters are applied to the size of a dataset to derive various sealed characteristics of the job profile. These sealed characteristics of the job profile can then be used in a performance model to allow for computation of performance parameters associated with the job.

In further implementations, a job profile and a performance model corresponding to the job can be used for determining allocation of resources to the job. The allocated resources are used to execute the map tasks and the reduce tasks of the job in a system to meet a performance goal of the job.

In some examples, the performance goal associated with a job can be expressed as a target completion time, which can be a specific deadline, or some other indication of a time duration within which the job should be executed. Other performance goals can be used in other examples. For example, a performance goal can be expressed as a service level objective (SLO), which specifies a level of service to be provided (expected performance, expected time, expected cost etc.).

Although reference is made to the MapReduce framework in some examples, it is noted that techniques or mechanisms according to some implementations can be applied in other distributed processing frameworks that employ map tasks and reduce tasks. More generally, "map tasks" are used to process input data to output intermediate results, based on a pre-defined function that defines the processing to be performed by the map tasks. "Reduce tasks" take as input partitions of the intermediate results to produce outputs, based on a pre-defined function that defines the processing to be performed by the reduce tasks. The map tasks are considered to be part of a map stage, whereas the reduce tasks are considered to be part of a reduce stage. In addition, although reference is made to unstructured data in some examples, techniques or mechanisms according to some implementations can also be applied to structured data formatted for relational database management systems.

FIG. 1 illustrates an example arrangement that provides a distributed processing framework that includes mechanisms according to some implementations. As depicted in FIG. 1, a storage subsystem 100 includes multiple storage modules 102, where the multiple storage modules 102 can provide a distributed file system 104. The distributed file system 104 stores multiple segments 106 of input data across the multiple storage modules 102. The distributed file system 104 can also store outputs of map and reduce tasks.

The storage modules 102 can be implemented with storage devices such as disk-based storage devices or integrated circuit storage devices. In some examples, the storage modules 102 correspond to respective different physical storage devices. In other examples, plural ones of the storage modules 102 can be implemented on one physical storage device, where the plural storage modules correspond to different logical partitions of the storage device.

The system of FIG. 1 further includes a master node 110 that is connected to slave nodes 112 over a network 114. The network 114 can be a private network (e.g., a local area network or wide area network) or a public network (e.g., the Internet), or some combination thereof. The master node 110 includes one or multiple central processing units (CPUs) 124. Each slave node 112 also includes one or multiple CPUs (not shown). Although the master node 110 is depicted as being separate from the slave nodes 112, it is noted that in alternative examples, the master node 112 can be one of the slave nodes 112.

A "node" refers generally to processing infrastructure to perform computing operations. A node can refer to a computer, or a system having multiple computers. Alternatively, a node can refer to a CPU within a computer. As yet another example, a node can refer to a processing core within a CPU that has multiple processing cores. More generally, the system can be considered to have multiple processors, where each processor can be a computer, a system having multiple computers, a CPU, a core of a CPU, or some other physical processing partition.

In accordance with some implementations, a scheduler 108 in the master node 110 is configured to perform scheduling of jobs on the slave nodes 112. The slave nodes 112 are considered the working nodes within the cluster that makes up the distributed processing environment.

Each slave node 112 has a corresponding number of map slots and reduce slots, where map tasks are run in respective map slots, and reduce tasks are run in respective reduce slots. The number of map slots and reduce slots within each slave node 112 can be preconfigured, such as by an administrator or by some other mechanism. The available map slots and reduce slots can be allocated to the jobs. The map slots and reduce slots are considered the resources used for performing map and reduce tasks. A "slot" can refer to a time slot or alternatively, to some other share of a processing resource that can be used for performing the respective map or reduce task. Depending upon the load of the overall system, the number of map slots and number of reduce slots that can be allocated to any given job can vary.

The slave nodes 112 can periodically (or repeatedly) send messages to the master node 110 to report the number of free slots and the progress of the tasks that are currently running in the corresponding slave nodes.

Each map task processes a logical segment of the input data that generally resides on a distributed file system, such as the distributed file system 104 shown in FIG. 1. The map task applies the map function on each data segment and buffers the resulting intermediate data. This intermediate data is partitioned for input to the reduce tasks.

The reduce stage (that includes the reduce tasks) has three phases: shuffle phase, sort phase, and reduce phase. In the shuffle phase, the reduce tasks fetch the intermediate data from the map tasks. In the sort phase, the intermediate data from the map tasks are sorted. An external merge sort is used in case the intermediate data does not fit in memory. Finally, in the reduce phase, the sorted intermediate data (in the term of a key and all its corresponding values, for example) is passed on the reduce function. The output from the reduce function is usually written back to the distributed file system 104.

In addition to the scheduler 108, the master node 110 of FIG. 1 includes a job profiler 120 that is able to create a job profile for a given job, in accordance with some implementations. As discussed above, the job profile describes characteristics of map and reduce tasks of the given job to be performed by the system of FIG. 1. A job profile created by the job profiler 120 can be stored in a job profile database 122. The job profile database 122 can store multiple job profiles, including job profiles of jobs that have executed in the past. As noted above, the characteristics of the job profile vary with input dataset sizes. Thus, an input to the job profiler 120 is an input parameter (DATASET_SIZE) that specifies the size of a dataset to be processed by a corresponding job. Note that DATASET_SIZE can represent the size of intermediate data output by the map stage for processing by the reduce stage. Rather than a size of the entire dataset, DATASET_SIZE can represent a size of data to be processed per reduce task.

The master node 110 also includes a resource estimator 116 that is able to allocate resources, such as numbers of map slots and reduce slots, to a job, given a performance goal (e.g. target completion time) associated with the job. The resource estimator 116 receives as input a job profile, which can be a job profile created by the job profiler 120, or a job profile previously stored in the job profile database 122. The resource estimator 116 also uses a performance model that calculates a performance parameter (e.g. time duration of the job) based on the characteristics of the job profile, a number of map tasks of the job, a number of reduce tasks of the job, and an allocation of resources (e.g., number of map slots and number of reduce slots).

Using the performance parameter calculated by the performance model, the resource estimator 116 is able to determine feasible allocations of resources to assign to the given job to meet the performance goal associated with the given job. As noted above, in some implementations, the performance goal is expressed as a target completion time, which can be a target deadline or a target time duration, by or within which the job is to be completed. In such implementations, the performance parameter that is calculated by the performance model is a time duration value corresponding to the amount of time the job would take assuming a given allocation of resources. The resource estimator 116 is able to determine whether any particular allocation of resources can meet the performance goal associated with a job by comparing a value of the performance parameter calculated by the performance model to the performance goal.

As shown in FIG. 1, the scheduler 108 receives the following inputs: job profiles from the job profiler 120 and/or profile database 122, and a specific allocation of resources from the resource estimator 116. Given the inputs received by the scheduler 108, the scheduler 108 is able to schedule the jobs for execution on available resources of the system, where the resources refer to map slots and reduce slots in respective slave nodes 112.

Figure 2:
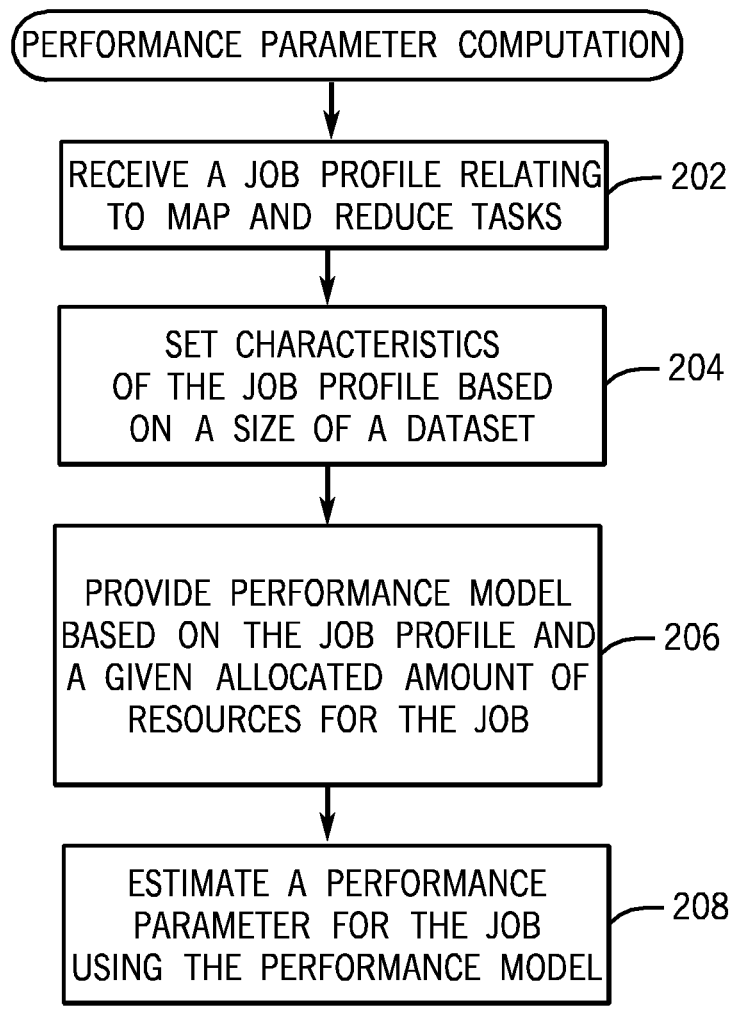
FIG. 2 is a flow diagram of a process of determining a performance characteristic according to some implementations.

FIG. 2 is a flow diagram of a process of computing a performance parameter of a job, in accordance with some implementations. The process receives (at 202) a job profile, where the job profile includes characteristics of a job to be executed. The characteristics of the job profile relate to map tasks and reduce tasks of the job. In addition, the characteristics of the job profile include characteristics that vary according to a size of a dataset to be processed by the job.

Based on the size of a dataset (represented as DATASET_SIZE in FIG. 1), the process sets (at 204) certain characteristics of the job profile. As discussed in detail further below, the setting performed at 204 involves scaling the certain characteristics of the job profile.

The process provides (at 206) a performance model based on the job profile (that contains the scaled characteristics) and a given allocated amount of resources for the job. A performance parameter of the job is then estimated (at 208) using the performance model. Details regarding estimation of a performance parameter based on a performance model are discussed further below.

Figure 3:
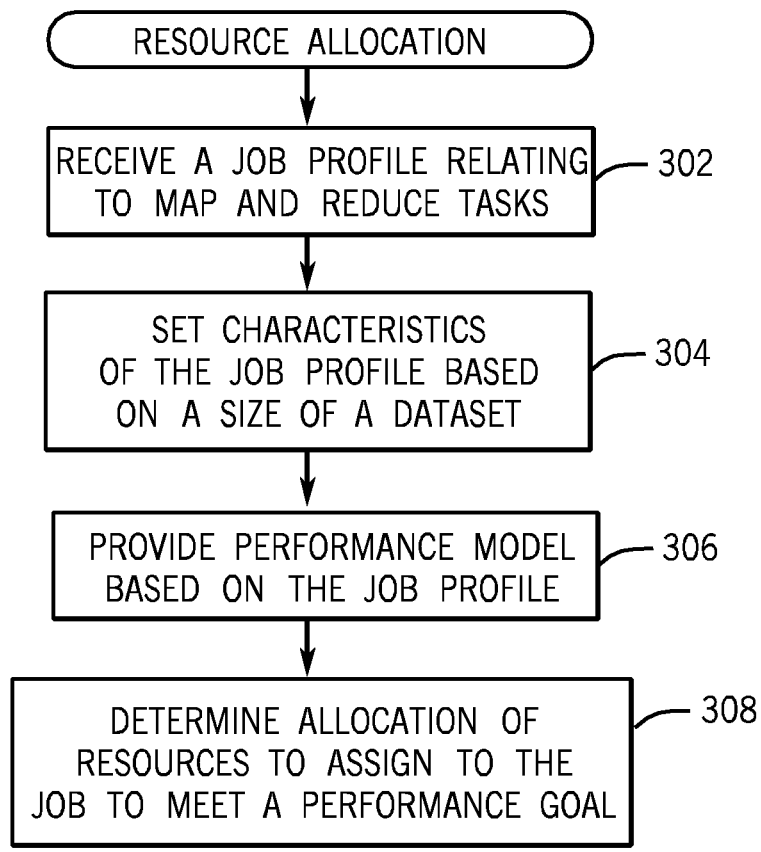
FIG. 3 is a flow diagram of a process of allocating resources to jobs, in accordance with alternative implementations.

FIG. 3 is a flow diagram of a process of resource allocation, according to alternative implementations. The process of FIG. 3 receives (at 302) a job profile that includes characteristics of the job to be executed, where the characteristics of the job profile include characteristics that vary according to a size of a dataset.

Based on the size of a dataset (represented as DATASET_SIZE in FIG. 1), the process sets (at 304) certain characteristics of the job profile. A performance model is then provided (at 306) that calculates a performance parameter based on the characteristics of the job profile (that contains the scaled characteristics). A value of the performance parameter calculated by the performance model is then used to determine (at 308) an allocation of resources to assign to the job to meet a performance goal associated with the job.

Figure 4A:
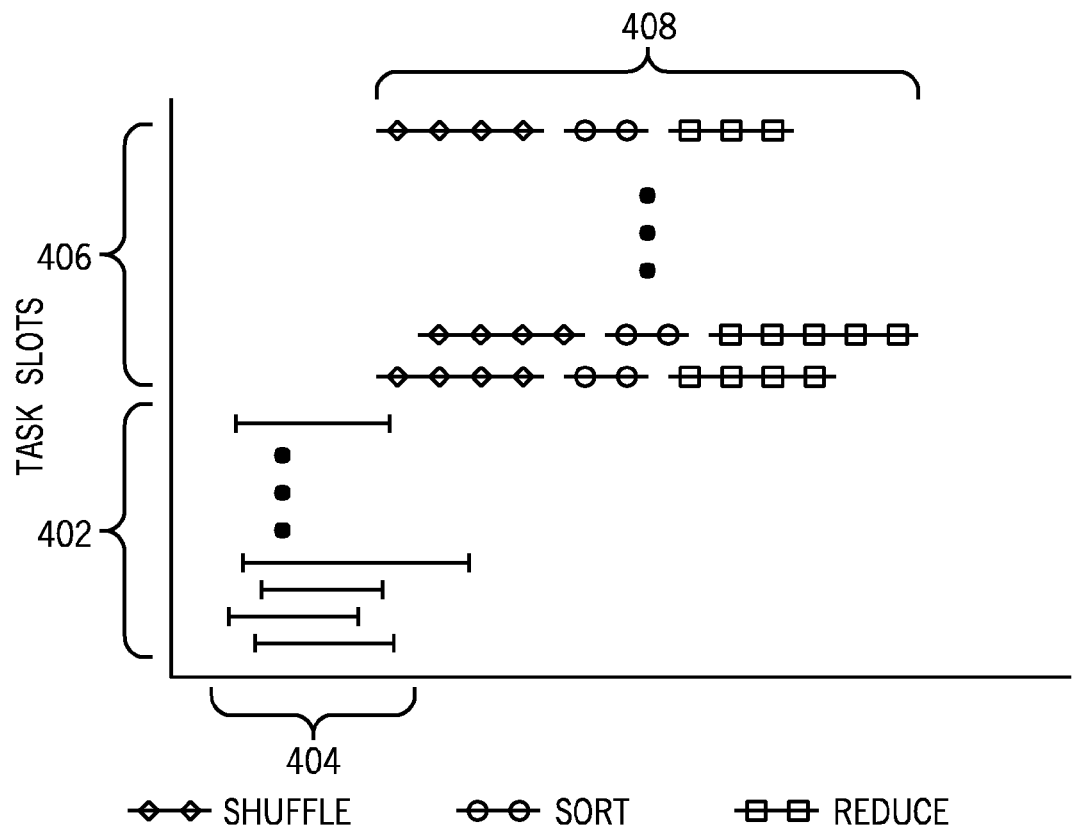
FIGS. 4A-4B are graphs illustrating map tasks and reduce tasks of a job in a MapReduce environment, according to some examples.
Figure 4B:
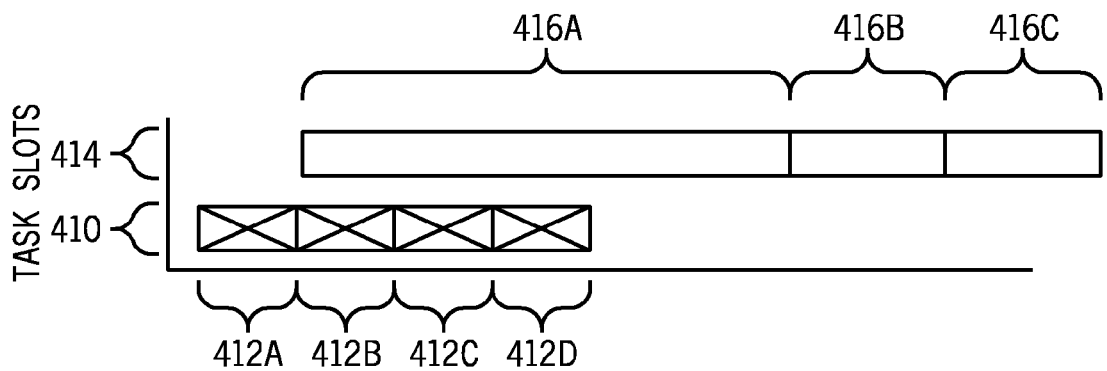

FIGS. 4A and 4B illustrate differences in completion times of performing map and reduce tasks of a given job due to different allocations of map slots and reduce slots. FIG. 4A illustrates an example in which there are 64 map slots and 64 reduce slots allocated to the given job. The example also assumes that the total input data to be processed for the given job can be separated into 64 partitions. Since each partition is processed by a corresponding different map task, the given job includes 64 map tasks. Similarly, 64 partitions of intermediate results output by the map tasks can be processed by corresponding 64 reduce tasks. Since there are 64 map slots allocated to the map tasks, the execution of the given job can be completed in a single map wave.

As depicted in FIG. 4A, the 64 map tasks are performed in corresponding 64 map slots 402, in a single map wave (represented generally as 404). Similarly, the 64 reduce tasks are performed in corresponding 64 reduce slots 406, also in a single reduce wave 408, which includes shuffle, sort, and reduce phases represented by different line patterns in FIG. 4A.

A "map wave" refers to an iteration of the map stage. If the number of allocated map slots is greater than or equal to the number of map tasks, then the map stage can be completed in a single iteration (single wave). However, if the number of map slots allocated to the map stage is less than the number of map tasks, then the map stage would have to be completed in multiple iterations (multiple waves). Similarly, the number of iterations (waves) of the reduce stage is based on the number of allocated reduce slots as compared to the number of reduce tasks.

In a different example, if there are more than 64 map tasks (e.g. 71 map tasks), but there are still only 64 map slots, then the map stage would have to be performed in two map waves. The first map wave would process 64 map tasks, while the second map wave would process 7 map tasks. It is also assumed that there are 64 reduce tasks and 64 assigned reduce slots, such that the reduce stage can be performed in one reduce wave. The shuffle phase of the reduce stage can be completed only when all the map tasks are completed, and the shuffle phase can overlap with both map waves.

FIG. 4B illustrates a different allocation of map slots and reduce slots as compared to FIG. 4A. Assuming the same given job (input data that is divided into 64 partitions), if the number of resources allocated is reduced to 16 map slots and 22 reduce slots, for example, then the completion time for the given job will change (increase). FIG. 4B illustrates execution of map tasks in the 16 map slots 410. In FIG. 4B, instead of performing the map tasks in a single wave as in FIG. 4A, the example of FIG. 4B illustrates four waves 412A, 412B, 412C, and 412D of map tasks. The reduce tasks are performed in the 22 reduce slots 414, in three waves 416A, 416B, and 416C. The completion time of the given job in the FIG. 4B example is greater than the completion time in the FIG. 4A example, since a smaller amount of resources was allocated to the given job in the FIG. 4B example than in the FIG. 4A example.

Thus, it can be observed from the examples of FIGS. 4A and 4B that the execution times of any given job can vary when different amounts of resources are allocated to the job.

Note also that while executions of the four map waves of FIG. 4B resemble each other, there can be a difference between the first reduce wave and the following two reduce waves. The shuffle phase of the first reduce wave starts immediately after the first map task completes. Moreover, this first shuffle phase continues until all the map tasks are complete, and the intermediate data is copied to the active reduce tasks. Thus, the first shuffle phase overlaps with the entire map stage. The sort phase of the reduce tasks occurs in parallel with a shuffle phase, but can complete only after their shuffle phase is completed. Finally, after the sort phase is done, the reduce phase can be performed. After that, the released reduce slots become available for the next phase of reduce tasks. As shown in FIG. 4B, there can be a relatively large difference between the execution time of the first reduce wave (416A) and the execution times of the subsequent reduce waves (416B and 416C).

Further details regarding the job profile, performance model, determination of solutions of resource allocations, and scheduling of job tasks are discussed below.

A job profile reflects performance invariants that are independent of the amount of resources assigned to the job over time, for each of the phases of the job: map, shuffle, sort, and reduce phases. The job profile characteristics for each of such phases are provided below.

The map stage includes a number of map tasks. To characterize the distribution of the map task durations and other invariant properties, the following metrics can be specified in some examples:

$$(M_{min}, M_{avg}, M_{max}, \text{AvgSize}_M^{input}, \text{Selectivity}_M), \text{ where}$$

$M_{min}$ is the minimum map task duration. Since the shuffle phase starts when the first map task completes, $M_{min}$ is used as an estimate for the shuffle phase beginning.

$M_{avg}$ is the average duration of map tasks to indicate the average duration of a map wave.

$M_{max}$ is the maximum duration of a map task. Since the sort phase of the reduce stage can start only when the entire map stage is complete, i.e., all the map tasks complete, $M_{max}$ is used as an estimate for a worst map wave completion time.

$\text{AvgSize}_M^{input}$ is the average amount of input data for a map stage. This parameter is used to estimate the number of map tasks to be spawned for a new data set processing.

$\text{Selectivity}_M$ is the ratio of the map data output size to the map data input size. It is used to estimate the amount of intermediate data produced by the map stage as the input to the reduce stage (note that the size of the input data to the map stage is known).

As described earlier, the reduce stage includes the shuffle, sort and reduce phases. The shuffle phase begins only after the first map task has completed. The shuffle phase (of any reduce wave) completes when the entire map stage is complete and all the intermediate data generated by the map tasks have been provided to the reduce tasks and has been sorted.

In some implementations, the shuffle and sort phases are interwoven. As a result, the sort phase is included in the shuffle phase, and thus is not considered separately.

The reduce phase begins only after the shuffle/sort phase is complete. The profiles of the shuffle and reduce phases are represented by their average and maximum time durations. In addition, for the reduce phase, the reduce selectivity, denoted as $\text{Selectivity}_R$, is computed, which is defined as the ratio of the reduce data output size to its data input size.

As noted above, the shuffle phase of the first reduce wave may be different from the shuffle phase that belongs to the subsequent reduce waves (after the first reduce wave). This can happen because the shuffle phase of the first reduce wave overlaps with the map stage and depends on the number of map waves and their durations. Therefore, two sets of metrics are collected: $(Sh_{avg}^1, Sh_{max}^1)$ for average duration and maximum duration of a shuffle phase of the first reduce wave (referred to as the "first shuffle phase"), and $(Sh_{avg}^{typ}, Sh_{max}^{typ})$ for average duration and maximum duration of the shuffle phase of the subsequent reduce waves (referred to as "typical shuffle phase"). Since techniques according to some implementations are looking for the performance invariants that are independent of the amount of allocated resources to the job, a shuttle phase of the first reduce wave is characterized in a special way and the metrics $(Sh_{avg}^1$ and $Sh_{max}^1)$ reflect only durations of the non-overlapping portions (non-overlapping with the map stage) of the first shuffle. In other words, the durations represented by $Sh_{avg}^1$ and $Sh_{max}^1$ present portions of the duration of the shuffle phase of the first reduce wave that do not overlap with the map stage.

The job profile in the shuffle phase is characterized by two pairs of metrics relating to durations of the shuffle phase:

$$(Sh_{avg}^1, Sh_{max}^1), (Sh_{avg}^{typ}, Sh_{max}^{typ}).$$

The reduce phase begins only after the shuffle/sort phase is complete. The profile of the reduce phase is represented by the average and maximum of the reduce tasks durations ($R_{avg}$, $R_{max}$) and the reduce selectivity, denoted as $\text{Selectivity}_R$, which is defined as the ratio of the reduce data output size to its data input size:

$$(R_{avg}, R_{max}, \text{Selectivity}_R).$$

The foregoing metrics (characteristics) relating to the map and reduce stages are part of a job profile. Based on such job profile, a performance model can be used to calculate a performance parameter of a job. In some implementations, the performance parameter can be expressed as an upper bound parameter or a lower bound parameter or some determined intermediate parameter between the lower bound and upper bound (e.g. average of the tower and upper bounds). In implementations where the performance parameter is a completion time value, the lower bound parameter is a lower bound completion time, the upper bound parameter is an upper bound completion time, and the intermediate performance parameter is an intermediate completion time (e.g. average completion time that is an average of the upper and lower completion). In other implementations, instead of calculating the average of the upper bound and lower bound to provide the intermediate performance parameter, a different intermediate parameter can be calculated, such as a value based on a weighted average of the lower and upper bounds or application of some other predefined function on the lower and upper bounds.

In some examples, the lower and upper bounds are for a makespan (a completion time of the job) of a given set of n (n>1) tasks that are processed by k (k>1) servers (or by k slots in a MapReduce environment). Let $T_1, T_2, \ldots T_n$ be the respective durations of n tasks of a given job. Let k be the number of slots that can each execute one task at a time. The assignment of tasks to slots can be done using a simple, online, greedy algorithm, e.g. assign each task to the slot with the earliest finishing time.

Let $\mu=(\Sigma_{1=n}^n T_1)/n$ and $\lambda=\max_1\{T_1\}$ be the mean and maximum durations of the n tasks, respectively. The makespan of the greedy task assignment is at least $n \cdot \mu/k$ and at most $(n-1) \cdot \mu/k + \lambda$. The lower bound is trivial, as the best case is when all n tasks are equally distributed among the k slots (or the overall amount of work $n \cdot \mu$ is processed as fast as it can by k slots). Thus, the overall makespan (completion time of the job) is at least $n \cdot \mu/k$ (lower bound of the completion time).

For the upper hound of the completion time for the job, the worst case scenario is considered, i.e., the longest task $(\hat{T}) \in (T_1, T_2, \ldots, T_n)$ with duration $\lambda$ is the last task processed. In this case, the time elapsed before the last task $(\hat{T})$ is scheduled is $(\Sigma_{1=n}^{n-1} T_1)/k \leq (n-1) \cdot \mu/k$. Thus, the makespan of the overall assignment is at most $(n-1) \cdot \mu/k + \lambda$. These bounds are particularly useful when $\lambda \ll n \cdot \mu/k$, in other words, when the duration of the longest task is small as compared to the total makespan.

The difference between lower and upper bounds (of the completion time) represents the range of possible job completion times due to non-determinism and scheduling. As discussed below, these lower and upper bounds, which are part of the properties of the performance model, are used to estimate a completion time for a corresponding job J.

The given job J has a given profile created by the job profiler 120 or extracted from the profile database 122 (FIG. 1). Let J be executed with an input dataset that can be partitioned into $N_M^J$ map tasks and $N_R^J$ reduce tasks. Let $S_M^J$ and $S_R^J$ be the number of map slots and number of reduce slots, respectively, allocated to job J. The "J" superscript in a parameter indicates that the respective parameter as associated with job J.

Let and $M_{avg}$ and $M_{max}$ be the average and maximum time durations of map tasks (defined by the job J profile). Then, based on the Makespan theorem, the lower and upper bounds on the duration of the entire map stags (denoted as $T_M^{low}$ and $T_M^{up}$, respectively) are estimated as follows:

$$T_M^{low} = N_M^J / S_M^J \cdot M_{avg}, \quad (\text{Eq. 1})$$

$$T_M^{up} = (N_M^J - 1)/S_M^J \cdot M_{avg} + M_{max}. \quad (\text{Eq. 2})$$

Stated differently, the lower bound of the duration of the entire map stage is based on a product of the average duration ($M_{avg}$) of map tasks multiplied by the ratio of the number of map tasks ($N_M^J$) to the number of allocated map slots ($S_M^J$). The upper bound of the duration of the entire map stage is based on a sum of the maximum duration of map tasks ($M_{max}$) and the product of $M_{avg}$ with $(N_M^J - 1)/S_M^J$. Thus, it can be seen that the lower and upper bounds of durations of the map stage are based on characteristics of the job J profile relating to the map stage, and based on the allocated number of map slots.

Similar to the computation of the lower and upper bounds of the map stage, the lower and upper bounds of time durations for each of the shuffle phase ($T_{Sh}^{low}, T_{Sh}^{up}$), and reduce phase ($T_R^{low}, T_R^{up}$) are computed (it is assumed that the sort phase is interleaved with the shuffle phase and thus the sort phase is considered as part of the shuffle phase). The computation of the Makespan theorem is based on the average and maximum durations of the tasks in these phases (respective values of the average and maximum time durations of the shuffle phase, and the average and maximum time duration of the reduce phase) and the numbers of reduce tasks $N_R$ and allocated reduce slots $S_R$, respectively. The formulae for calculating ($T_{Sh}^{low}, T_{Sh}^{up}$) and ($T_R^{low}, T_R^{up}$) are similar to the formulae for calculating $T_M^{up}$ and $T_M^{up}$ set forth above, except variables associated with the reduce tasks and reduce slots and the respective phases of the reduce stage are used instead.

The subtlety lies in estimating the duration of the shuffle phase. As noted above, the first shuffle phase is distinguished from the task durations in the typical shuffle phase (which is a shuffle phase subsequent to the first shuffle phase). As noted above, the first shuffle phase includes measurements of a portion of the first shuffle phase that does not overlap the map stage. The portion of the typical shuffle phase in the subsequent reduce waves (after the first reduce wave) is computed as follows:

$$T_{Sh}^{low} = \left(\frac{N_R^J}{S_R^J} - 1\right) \cdot Sh_{avg}^{typ}, \quad (\text{Eq. 3})$$

$$T_{Sh}^{up} = \left(\frac{N_R^J - 1}{S_R^J} - 1\right) \cdot Sh_{avg}^{typ} + Sh_{max}^{typ}. \quad (\text{Eq. 4})$$

where $Sh_{avg}^{typ}$ is the average duration of a typical shuffle phase, and $Sh_{max}^{typ}$ is the maximum duration of the typical shuffle phase. The formulae for the lower and upper bounds of the overall completion time of job J are as follows:

$$T_J^{low} = T_M^{low} + Sh_{avg}^1 + T_{Sh}^{low} + T_R^{low}, \quad (\text{Eq. 5})$$

$$T_J^{up} = T_M^{up} + Sh_{max}^1 + T_{Sh}^{up} + T_R^{up}, \quad (\text{Eq. 6})$$

where $Sh_{avg}^1$ is the average duration of the first shuffle phase, and $Sh_{max}^1$ is the maximum duration of the first shuffle phase. $T_J^{low}$ and $T_J^{up}$ represent optimistic and pessimistic predictions (lower and upper bounds) of the job J completion time. Thus, it can be seen that the lower and upper bounds of time durations of the job J are based on characteristics of the job J profile and based on the allocated numbers of map and reduce slots. The performance model, which includes $T_J^{low}$ and $T_J^{up}$ in some implementations, is thus based on both the job profile as well as allocated numbers of map and reduce slots.

In some implementations, instead of using the lower and upper bounds, an intermediate performance parameter value can be used, such as an average value $T_J^{avg}$ between the lower and upper bounds:

$$T_J^{avg} = (T_J^{up} + T_J^{low})/2. \quad (\text{Eq. 7})$$

Eq. 5 for $T_J^{low}$ can be rewritten by replacing its parts with Eq. 1 and Eq. 3 and similar equations for sort and reduce phases as follows:

$$T_J^{low} = \frac{N_M^J \cdot M_{avg}}{S_M^J} + \frac{N_R^J \cdot (Sh_{avg}^{typ} + R_{avg})}{S_R^J} + Sh_{avg}^1 - Sh_{avg}^{typ}, \quad (\text{Eq. 8})$$

The alternative presentation of Eq. 8 allows the estimates for completion time to be expressed in a simplified form shown below:

$$T_J^{low} = A_J^{low} \cdot \frac{N_M^J}{S_M^J} + B_J^{low} \cdot \frac{N_R^J}{S_R^J} + C_J^{low}, \quad (\text{Eq. 9})$$

where $A_J^{low} = M_{avg}, B_J^{low} = (Sh_{avg}^{typ} + R_{avg})$, and $C_J^{low} = Sh_{avg}^1 - Sh_{avg}^{typ}$. Eq. 9 provides an explicit expression of a job completion time as a function of map and reduce slots allocated to job J for processing its map and reduce tasks, i.e., as a function of $(N_M^J, N_R^J)$ and $(S_M^J, S_R^J)$. The equations for $T_J^{up}$ and $T_J^{avg}$ can be rewritten similarly.

The foregoing explains how a job profile can be derived and used for predicting a performance parameter (e.g. job completion time) when different amounts of resources (different allocations of slots) are used. However, as noted further above, complexity is introduced when the ratio of the number of map tasks to the number of reduce tasks varies due to variations in input dataset size. To address such variations in the ratio of the number of map tasks to the number of reduce tasks in the presence of varying dataset sizes, scaling parameters can be defined to scale certain characteristics of the job profile.

In some implementations, the duration of individual map tasks is not impacted by increasing input dataset size because this larger dataset is split into a larger number of map tasks but each map task processes a similar portion of data. However, a larger dataset can result in an increased duration of the reduce tasks if the number of reduce tasks is not increased proportionally to the increase in dataset size. One may attempt to derive a single sealing factor for reduce task duration as a function of the size of the input dataset, and to use the single scaling factor for both shuffle and reduce phase duration scaling. However, this may lead to inaccurate results, since the shuffle phase performs data transfer and its duration is mainly defined by network performance. The reduce phase duration is defined by the application-specific computation of the user-supplied reduce function and depends on storage device write performance. Thus, the duration scaling in these phases may be different. Consequently, in accordance with some implementations, two scaling factors are derived for shuffle and reduce phases separately, each one as a function of a dataset size (which can be the size of the intermediate results output by the map stage). In implementations where the sort phase is not interleaved with the shuffle phase, another scaling factor can be specified for the sort phase.

To derive the scaling factors, a set of k (k>1) experiments are performed for a given MapReduce job for processing different size input datasets (while keeping the number of reduce tasks constant). In other words, the MapReduce job in each of the k experiments processes a corresponding dataset of a respective different size. For example, in a first experiment, the MapReduce job processes a dataset of a first size, in a second experiment, the MapReduce job processes a dataset of a second size, and so forth. Shuffle phase and reduce phase duration measurements are collected in the corresponding k experiments. The duration measurements include $Sh_{i,avg}^1$, $Sh_{i,max}^1$, $Sh_{i,avg}^{typ}$, $Sh_{i,max}^{typ}$, $R_{i,avg}$, and $R_{i,max}$ (i=1 to k).

The scaling factors can be derived using linear regression as follows. Let $D_i$ be the amount of intermediate data for processing per reduce task, and let $Sh_{i,avg}^{typ}$ and $R_{i,avg}$ be the measured job profile durations for the shuffle and reduce phases, respectively, in experiment i. Then, using linear regression, the following sets of equations are solved:

$$C_0^{Sh}+C_1^{Sh}\cdot D_i=Sh_{i,avg}^{typ}, (i=1,2,\ldots,k).\qquad\text{(Eq. 10)}$$

$$C_0^R+C_1^R\cdot D_i=R_{i,avg}, (i=1,2,\ldots,k).\qquad\text{(Eq. 11)}$$

Solving the foregoing sets of equations derives scaling factors ($C_0^{Sh}, C_1^{Sh}$) for a shuffle phase and scaling factors ($C_0^R, C_1^R$) for a reduce phase—such scaling factors can be incorporated in the job profile. When job J processes a dataset that leads to a different size of intermediate data $D_{new}$ per reduce task, the shuffle and reduce phase durations of the job J profile are updated as $Sh_{avg}^{typ}=C_0^{Sh}+C_1^{Sh}\cdot D_{new}$ and $R_{avg}=C_0^R+C_1^R\cdot D_{new}$. Similar scaling can be performed for maximum durations $Sh_{max}^{typ}$ and $R_{max}$ as well as for the first shuffle phase measurements $Sh_{avg}^1$, $Sh_{max}^1$.

By using techniques or mechanisms according to some implementations, characteristics of a job profile can be automatically scaled in response to variations in input dataset sizes. The scaling of the job profile characteristics allows for more accurate computation of performance parameters for respective jobs, as well as for more accurate determinations of resource allocation for jobs.

Examples of determining an allocation of resources to assign to a job (308 in FIG. 3) are explained further below. Further details regarding allocation of resources are provided in U.S. Ser. No. 13/019,529, entitled "DETERMINING AN ALLOCATION OF RESOURCES FOR A JOB," filed Feb. 2, 2011, by Ludmila Cherkasova et al. In some implementations, the allocation of resources is based on the following pseudocode.

```
Initialization:
    if (N_M^J ≤ S_M){S_M^J ⇐ N_M^J} else {S_M^J ⇐ S_M}; continue ⇐ true;
Main Computation:
    while continue {
        T_M^low ⇐ (N_M^J/S_M^J) · M_avg;
        Solving for the minimal S_R^J that satisfies the following inequality;
```

-continued

```
        T_M^low + Sh_avg^1 + (N_R^J/S_R^J - 1) · Sh_avg^typ + (N_R^J/S_R^J) ·
            (Sort_avg + R_avg) ≤ T;
        if (S_R^J > 0)&(S_R^J ≤ S_R) {
            Add (S_M^J, S_R^J) to a list L_low^J of feasible solutions.
            S_M^J ⇐ S_M^J - 1; // decreasing the number of map
                slots for the next iteration.
        }
        else { // there is no a feasible solution for a current value of S_M^J;
            continue ⇐ false;
        }
    }
```

The pseudocode is described below. Pairs ($S_M^J, S_R^J$) of minimal allocations of map and reduce slots that support job J completion time T as a lower bound are identified. In some examples, the allocation of map slots is initially set to the largest possible allocation, by considering the total number of map tasks $N_M^J$ that job J should process and the number of map slots $S_M$ available in the system. Note that $S_M$ (the total number of map slots available in the system) would be shared among multiple jobs if multiple jobs are to be concurrently executed, so all $S_M$ map slots may not be available for the job J under consideration. If $N_M^J \le S_M$ (the number of map tasks of the job J is less than or equal to the total number $S_M$ of map slots in the system), then the map slot allocation (number of allocated map slots $S_M^J$) is set equal to $N_M^J$; otherwise $S_M^J$ is set to $S_M$.

Using this map slot allocation, (denoted as $S_M^J$), the amount of reduce slots (denoted as $S_R^J$) for completing job J within time T is calculated while using the lower bound equation Eq. 9 for estimating the job completion time. If a calculated value of $S_R^J$ is positive and less than the overall number of reduce slots available in the system, then pair ($S_M^J, S_R^J$) represents a feasible solution for achieving a given performance goal. The situation when a calculated value of $S_R^J$ is negative corresponds to the case when the predicted completion time of a map stage under the current map slot allocation $S_M^J$ is higher than a given time T. This means that job J cannot complete within T with allocated map slots $S_M^J$. A similar situation occurs when the calculated number of reduce slots for completing job J within time T is higher than the overall number of available reduce slots $S_R^J$ in the system.

When a feasible solution ($S_R^J, S_M^J$) is found, the feasible solution can be added to a list ($L_{low}^J$) of feasible solutions for the job J. Further iterations can be performed with a reduced number of map slots ($S_M^J = S_M^J - 1$). In this manner, multiple feasible solutions can be identified.

In other examples, other techniques of performing resource allocation can be employed.

Machine-readable instructions described above (including various modules of FIG. 1) are executed on a processor or multiple processors (set as 124 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable-disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a system having a processor, comprising: receiving a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results, wherein the characteristics of the job profile include at least one particular characteristic that varies according to a size of data to be processed;
setting at least the particular characteristic of the job profile based on the size of the data to be processed;
providing a performance model based on the job profile containing the set particular characteristic and an allocated amount of resources for the job; and
estimating a performance parameter of the job using the performance model.

2. The method of claim 1, wherein estimating the performance parameter comprises estimating a time duration of the job.

3. The method of claim 1, further comprising:
computing at least one scaling factor according to the size of the data to be processed; and
applying the at least one scaling factor to the size of the data to be processed to set at least the particular characteristic.

4. The method of claim 3, wherein the particular characteristic includes a time duration of at least one phase of the job, and wherein setting at least the particular characteristic of the job profile comprises varying the time duration of the at least one phase of the job by applying the at least one scaling factor to the size of the data to be processed.

5. The method of claim 4, wherein the time duration of the at least one phase comprises a time duration of a shuffle phase and a time duration of a reduce phase, wherein the reduce tasks are performed in the shuffle phase and the reduce phase.

6. The method of claim 5, wherein the size of the data to be processed comprises a size of the intermediate results to be processed by a reduce stage that includes the reduce tasks, and wherein setting at least the particular characteristic of the job profile comprises varying a time duration of a phase of the reduce stage by applying the at least one scaling factor to the size of the data to be processed.

7. The method of claim 1, further comprising:
determining, based on the estimated performance parameter, whether a performance goal of the job will be satisfied.

8. The method of claim 7, further comprising receiving an indication of the allocated amount of resources for the job, wherein the allocated amount of resources comprises an allocated number of map slots and number of reduce slots, wherein the map tasks are performed in the map slots, and the reduce tasks are performed in the reduce slots.

9. The method of claim 1, wherein providing the performance model comprises providing the performance model having a lower bound and an upper bound of the performance parameter.

10. The method of claim 1, wherein receiving the job profile including the characteristics of the job includes receiving the job profile including plural ones of: a minimum time duration of a map task, an average time duration of a map task, a maximum time duration of a map task, an average size of input data for a map task, an average time duration of a reduce task, and a maximum time duration of a reduce task.

11. An article comprising at least one non-transitory machine-readable storage medium storing instructions that upon execution cause a system having a processor to:
receive a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results, and wherein the characteristics of the job profile include at least one particular characteristic that varies according to a size of data to be processed;
scale at least the particular attribute of the job profile based on the size of the data to be processed;
provide a performance model that calculates a performance parameter based on the characteristics of the job profile including the scaled particular attribute; and
determine, using a value of the performance parameter calculated by the performance model, an allocation of resources to assign to the job to meet a performance goal associated with the job.

12. The article of claim 11, wherein the instructions upon execution cause the system to further:
compute at least one scaling factor according to the size of the data to be processed, wherein the scaling is performed using the at least one scaling factor.

13. The article of claim 12, wherein computing the at least one scaling factor is based on solving for the at least one scaling factor based on measurements made in a number of experiments in which the job is executed with datasets of different sizes.

14. The article of claim 11, wherein the performance goal is a completion time, and wherein the performance parameter is a time value.

15. The article of claim 11, wherein scaling at least the particular attribute of the job profile comprises scaling a duration of a phase of the reduce tasks based on the size of the data to be processed.

16. The article of claim 15, wherein scaling the duration of the phase of the reduce tasks comprises scaling the duration of a shuffle phase or a reduce phase of the reduce tasks.

17. The article of claim 12, wherein scaling at least the particular attribute of the job profile comprises applying the at least one scaling factor that causes modification of a duration of a phase of the reduce tasks.

18. A system comprising:
- a storage medium to store a job profile that includes characteristics of a job to be executed, wherein the characteristics of the job profile relate to map tasks and reduce tasks of the job, wherein the map tasks produce intermediate results based on input data, and the reduce tasks produce an output based on the intermediate results, and where the characteristics of the job profile include at least one particular characteristic that varies according to a size of data to be processed; and
- at least one hardware processor to:
  - set at least the particular characteristic of the job profile based on the size of the data to be processed;
  - provide a performance model based on the job profile containing the set particular characteristic and an allocated amount of resources for the job; and
  - estimate a performance parameter of the job using the performance model.

19. The system of claim 18, wherein the particular characteristic comprises a duration of a phase of the reduce tasks, and wherein the setting of at least the particular characteristic comprises modifying the duration of the phase of the reduce tasks based on the size of the data to be processed.

20. The system of claim 19, wherein the at least one processor is to further compute at least one scaling factor based on the size of the data to be processed, wherein the modifying of the duration of the phase of the reduce tasks comprises computing the duration using the at least one scaling factor.

* * * * *